(12) United States Patent
Seppi

(10) Patent No.: US 9,669,413 B2
(45) Date of Patent: Jun. 6, 2017

(54) DEVICE FOR SHREDDING, COLLECTING AND TRANSPORTING SHREDDED MATERIAL

(71) Applicant: Seppi M. Spa, Kaltern (IT)

(72) Inventor: Lorenz Seppi, Kaltern (IT)

(73) Assignee: SEPPI M. SPA, Kaltern (IT)

( * ) Notice: Subject to any disclaimer, the term of this patent is extended or adjusted under 35 U.S.C. 154(b) by 279 days.

(21) Appl. No.: 14/359,597

(22) PCT Filed: Nov. 6, 2012

(86) PCT No.: PCT/EP2012/071902
§ 371 (c)(1),
(2) Date: May 21, 2014

(87) PCT Pub. No.: WO2013/075934
PCT Pub. Date: May 30, 2013

(65) Prior Publication Data
US 2014/0306045 A1    Oct. 16, 2014

(30) Foreign Application Priority Data

Nov. 21, 2011  (IT) .............................. BZ2011A0057

(51) Int. Cl.
*B02C 23/20*    (2006.01)
*A01D 34/43*    (2006.01)
*A01D 34/49*    (2006.01)

(52) U.S. Cl.
CPC .............. *B02C 23/20* (2013.01); *A01D 34/43* (2013.01); *A01D 34/49* (2013.01)

(58) Field of Classification Search
CPC .......... B02C 23/20; A01D 34/43; A01D 34/49
See application file for complete search history.

(56) References Cited

U.S. PATENT DOCUMENTS

| 2,836,023 | A | 5/1958 | Caldwell |
| 3,159,958 | A | 12/1964 | Mathews |
| 5,685,134 | A | 11/1997 | Thornburg |
| 2003/0061793 | A1 | 4/2003 | Wetzel |
| 2005/0156069 | A1 | 7/2005 | Berti et al. |
| 2010/0281839 | A1 | 11/2010 | Willibald |

FOREIGN PATENT DOCUMENTS

| DE | 102005034491 A1 | 1/2007 |
| IT | VR2006A149 | 9/2006 |

*Primary Examiner* — Mark Rosenbaum
(74) *Attorney, Agent, or Firm* — Jacobson Holman, PLLC.

(57) ABSTRACT

The invention relates to a device for comminuting, collecting and transporting of comminuted material, comprising a frame that is designed to be supported by a vehicle, a tool carrier rotor that is accommodated by the frame by means of an axis that is substantially parallel to the treated bottom and perpendicular to the driving direction of the vehicle, a drive that moves a shaft which is kinematically connected to the tool carrier rotor, and a cover that surrounds the tool carrier rotor on the upper side and that is connected to a feed channel. According to the invention at least one blower is provided in the cover and/or in the channel, which blower supports the flow of the material crushed by the tool carrier rotor, wherein at least two blowers are provided that are parallel to one another, that rotate in opposite directions, and that have a common chute.

9 Claims, 4 Drawing Sheets

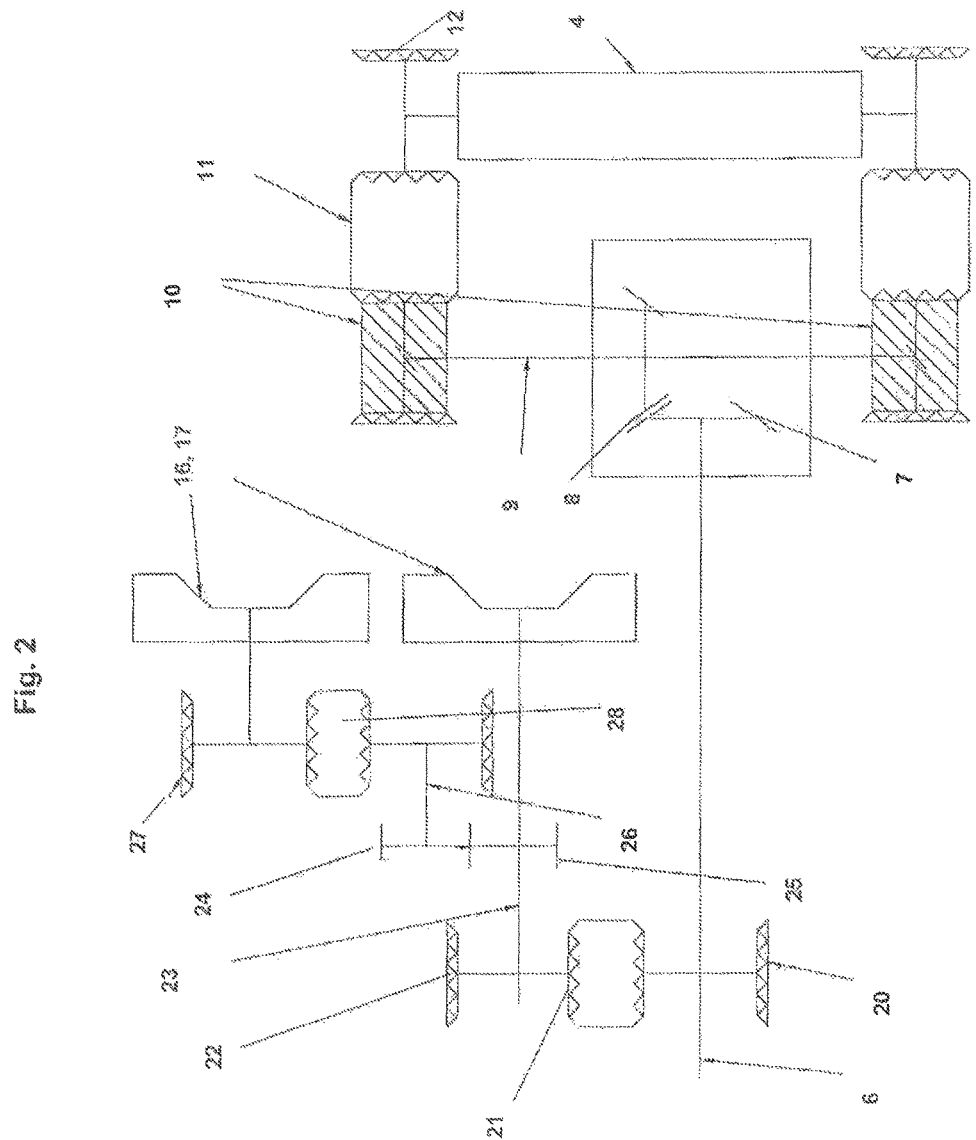

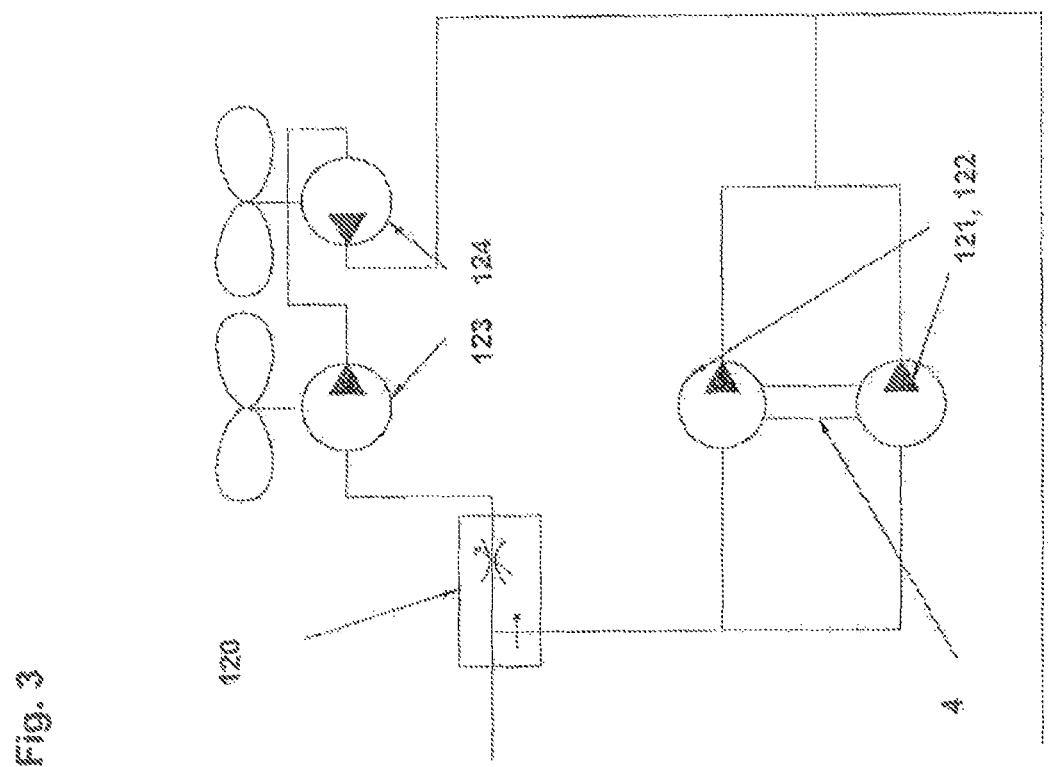

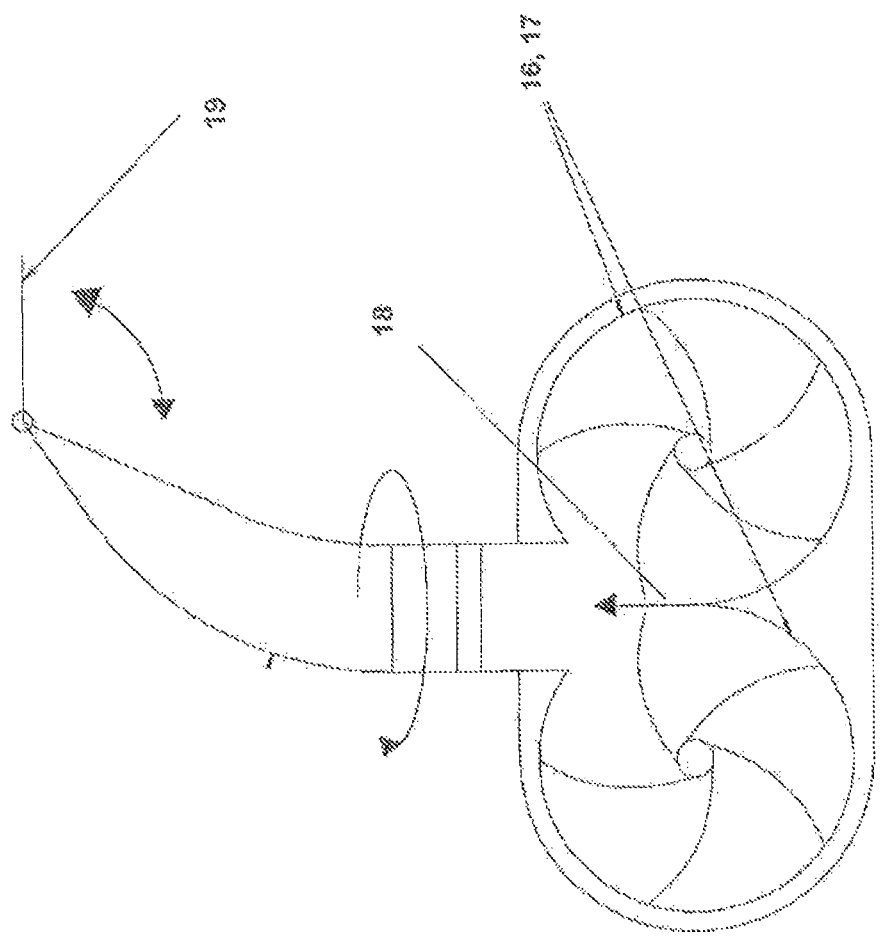

DEVICE FOR SHREDDING, COLLECTING AND TRANSPORTING SHREDDED MATERIAL

Figure 1:
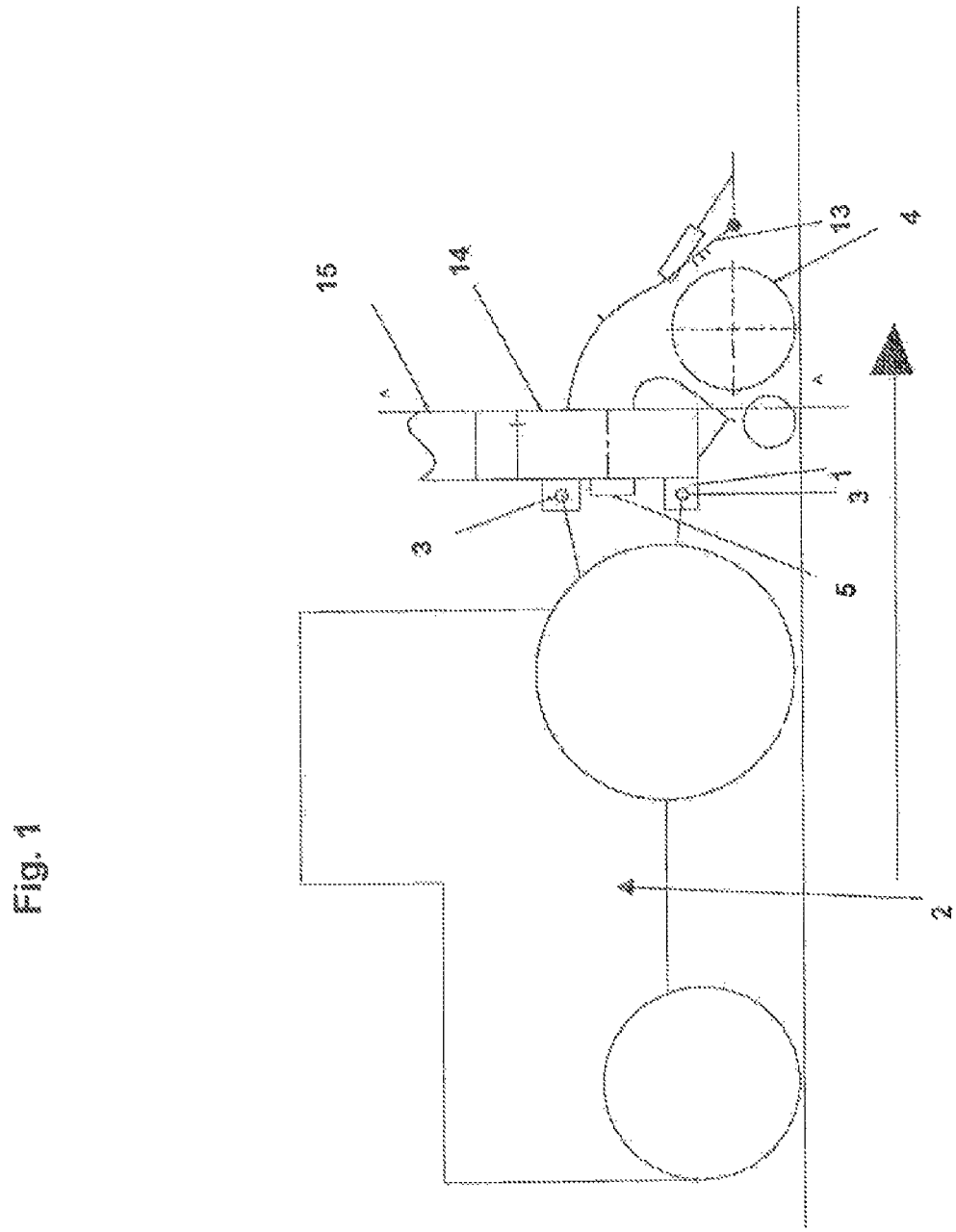

The present invention refers to a device for shredding, collecting and transporting shredded material according to the generic concept of the claim 1.

BACKGROUND ART

According to the background art, several devices capable of comminuting and collecting plant material and biomass that follow different principles are known. For example, there are known devices that use the air flow generated by a shredding rotor for transporting the shredded material into a container that is generally a part of the device (Berti patent US 2005156069 (A1)). For transporting the material into a container away from the rotor, are known systems that use the help of a series of additional transporting devices such as conveyor belts, augers and often fans are known. For example, these are known from the patents (Seppi ITVR20060149 (A1)), AHWI DE102005034491 A1).

However, the known devices have often the problem that the material flow is sometimes higher than the maximum flow allowed by transporting means positioned downstream of the shredding rotor. The consequence of this is that the material is not collected and still remains on the ground or that the secondary transporting means are clogged.

The present invention has the purpose to solve these problems and to allow for a fine shredding, an accurate collection and an effective transport at a determined distance.

This purpose is reached by a device for shredding, collecting and transporting shredded material according to the characterizing part of claim 1.

It is provided a device for shredding, collecting and transporting shredded material that comprises a frame designed to be brought by a self-propelled means, a tool holder rotor rotatably housed by the frame with axis substantially parallel to a ground to be treated and perpendicular to the moving direction of the self-propelled means, an actuator suitable for moving a shaft kinetically connected cinematically connected to the tool holder rotor and a hood upperly surrounding the tool holder rotor and connected to a conveyor channel.

If in the hood and/or in the conveyor channel is provided at least a fan, suitable for supporting the flow of material centrifuged by the tool holder rotor, cloggings or jams in the expulsion of the shredded material are avoided.

Preferably, two fans are provided.

In a variant, between the hood and the channel, it is provided a joint wherein it is housed the at least one fan with axis perpendicular to the axis of the tool holder rotor.

In another variant, the motion of at least one fan is derived from the inlet shaft operating the tool holder rotor.

Alternatively, it is provided a hydraulic unit that through a distribution valve powers the motor of the tool holder rotor and the hydraulic motors of fans.

Preferably, the channel outlet is equipped with a deflector designed to deviate the shredded material towards a user, for example, a container.

Other characteristics and details result from the claims and the following description of preferred embodiments shown in the attached figures, wherein:

FIG. 1 schematically shows a lateral view of a device for shredding, collecting and transporting shredded material, FIG. 2 schematically shows the transmission chain of the device of FIG. 1 in a first embodiment, FIG. 3 schematically shows the transmission chain of FIG. 1 in a second embodiment and FIG. 4 schematically shows the arrangement of fans before the chimney.

DESCRIPTION OF THE INVENTION

The device according to the invention is equipped with a frame 1 brought by a tractor 2 through a 3 points attachment 3. In frame 1 is rotatably mounted and housed a shredding rotor or a tool holder rotor 4. Said frame 1 has a shape adapted shred the material passing between the rotor 4 itself and the frame 1 and to expel the shredded material at the highest height of said frame 1.

The tool holder rotor 4 is operated by a belt transmission formed by pulleys 10 and 12 and by belts 11 and positioned laterally with respect to the rotor itself. The driving pulleys 10 and 12 can be operated in turn by a suitable gear box, a hydraulic motor 5 or other kinds of motors. The expelled material channeled through a hood 13 toward one, two or more parallel cone-shaped funnels 14. Said funnels 14 guide the material toward the center of other fans 16 and 17 that are positioned behind the frame of the shredding device with the rotation axis of the fans substantially parallel to the ground and parallel to the longitudinal axis of the device. These fans 16 and 17 are operated by a hydraulic motor 5 or another belt transmission that have size and power sufficient to generate an air flow higher than the one of the shredding rotor itself. The air and the plant material and the biomass along with it are expelled by fans through a chimney 15 that is mounted vertically and tangentially with respect to the fans. Other chimneys are thinkable, such as fans. If there are two fans for a multiple of two), the air flow of the two fans can be combined in a unique central chimney if the fans are counter-rotating. In this way, a unique expelling chimney to be controlled is sufficient. The material is directed by the chimney in the desired direction 18. As it is known by other devices, the chimney can be rotated around its vertical axis in order to direction the flow on a horizontal plane and the angle can be changed through deflectors 19 that determine the ending expelling angle.

The device is pulled or pushed according to the needs by a pulling device. The operation can take place by means of a mechanical power take-off or a hydraulic power take-off by other kinds of pulling devices. The device is provided with attachment points 3 for the attachment.

The transmission takes place through an inlet shaft 6 that mounts a pulley 20. The inlet shaft is in turn connected to a gearbox with a conical pair 7, 8 that returns the motion by 90 degrees on a shaft in direction parallel to the shaft of rotor 4. The rotor 4 is operated by means of a belt transmission 21. In the driving pulley 20 of this belt transmission is integrated a centrifugal coupling, that transmits a torque proportional to the rotation speed.

Another pulley 20, 22 mounted on another inlet shaft 23 in correspondence to the rotation axis of a fan is operated by the first pulley 20 through belts 21. In this case, two parallel and counter-rotating fans are used. On the same shaft, it is also mounted a pair of parallel-axis gears 24, 25 that operates an outlet shaft in opposite direction 26. On this shaft are mounted pulleys that transmit the motion to the other fan by means of belts. In order to allow the fans to rotate also when the tool holder rotor is jammed due to an overload, these are equipped with a free wheel, that permits to it to rotate by inertia when the inlet shaft loses rpm. The free wheel can be mounted for example between the pulley and the main inlet shaft 6.

In case of a hydraulic transmission, the device can be operated by hydraulic motors separated for each element in movement. The motors will be powered such that the fans have the priority on the tool holder rotor, for example using a main flow valve 120. Motors 123, 124 of fans are connected in series for permitting a synchronous rotation. The two motors 121, 122 for the operation of the tool holder rotor 4 are connected in parallel for keeping high the torque.

In a preferred embodiment, the blades of the fans can be mounted in such a way as to include the cutting elements. The fan not only brings the material, it can also shred it. These cutting elements can be positioned on the blades of the fan.

The invention claimed is:

1. A device for shredding, collecting and transporting shredded material, comprising a frame intended to be supported by a self-propelled means, a tool holder rotor housed rotatably by the frame with a substantially parallel axis to the ground to be treated and perpendicular to the running direction of the self-propelled means, an actuator adapted to move a shaft cinematically connected to the tool holder rotor, a hood surrounding the tool holder rotor from above and connected to a conveyor channel, wherein in the hood and/or in the channel at least one fan of at least two fans is provided adapted to support the flow of the material centrifuged by the tool holder rotor, wherein the at least two fans are provided such that they are parallel to each other, and have an expulsion chimney in common and wherein the inlet shaft, which drives the tool holder rotor, also drives the at least one fan.

2. The device according to claim 1, wherein the at least one fan comprises cutting elements.

3. The device according to claim 1, wherein between the hood and the channel a connector is provided in which the at least one fan is housed with an axis perpendicular to the axis of the tool holder rotor.

4. The device according to claim 1, wherein that the inlet shaft which drives the tool holder rotor comes from the motion of at least one fan.

5. The device according to claim 1, wherein a hydraulic control unit is provided which powers through a distribution valve the rotor of the tool holder rotor and hydraulic motors of the fans.

6. The device according to claim 1, wherein the at least one fan is arranged in the flow of the shredded material.

7. The device according to claim 1, wherein the at least one fan is sized so as to increase the capacity of the material shredded by the tool holder rotor.

8. The device according to claim 1, wherein the stopping of the at least one fan takes place after the stopping of the tool holder rotor.

9. The device according to claim 1, wherein the flow is generated in combination with tools capable of oscillating movement and movably connected to the tool holder rotor.

* * * * *